United States Patent
Holz

(10) Patent No.: US 11,418,706 B2
(45) Date of Patent: *Aug. 16, 2022

(54) ADJUSTING MOTION CAPTURE BASED ON THE DISTANCE BETWEEN TRACKED OBJECTS

(71) Applicant: Ultrahaptics IP Two Limited, Bristol (GB)

(72) Inventor: David S. Holz, San Francisco, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/246,522

(22) Filed: Apr. 30, 2021

(65) Prior Publication Data

US 2021/0258474 A1  Aug. 19, 2021

Related U.S. Application Data

(63) Continuation of application No. 16/857,104, filed on Apr. 23, 2020, now Pat. No. 10,999,494, which is a
(Continued)

(51) Int. Cl.
*G06T 7/50* (2017.01)
*H04N 5/232* (2006.01)
(Continued)

(52) U.S. Cl.
CPC ........... *H04N 5/23219* (2013.01); *G06T 7/50* (2017.01); *G06T 7/70* (2017.01); *G06V 40/28* (2022.01); *G06T 2207/30196* (2013.01)

(58) Field of Classification Search
None
See application file for complete search history.

(56) References Cited

U.S. PATENT DOCUMENTS 8,605,202 B2  12/2013  Muijs et al.
9,070,019 B2   6/2015  Holz
(Continued)

FOREIGN PATENT DOCUMENTS

JP  2010060548    3/2010
JP  2010060548 A  3/2010
(Continued)

OTHER PUBLICATIONS

U.S. Appl. No. 16/857,104—Office Action dated Sep. 22, 2020, 11 pages.
(Continued)

*Primary Examiner* — Eileen M Adams
(74) *Attorney, Agent, or Firm* — Haynes Beffel & Wolfeld LLP; Ernest J. Beffel, Jr.; Paul A. Durdik

(57) ABSTRACT

The technology disclosed relates to adjusting the monitored field of view of a camera and/or a view of a virtual scene from a point of view of a virtual camera based on the distance between tracked objects. For example, if the user's hand is being tracked for gestures, the closer the hand gets to another object, the tighter the frame can become—i.e., the more the camera can zoom in so that the hand and the other object occupy most of the frame. The camera can also be reoriented so that the hand and the other object remain in the center of the field of view. The distance between two objects in a camera's field of view can be determined and a parameter of a motion-capture system adjusted based thereon. In particular, the pan and/or zoom levels of the camera may be adjusted in accordance with the distance.

20 Claims, 8 Drawing Sheets

Related U.S. Application Data continuation of application No. 16/504,120, filed on Jul. 5, 2019, now Pat. No. 10,638,036, which is a continuation of application No. 15/989,092, filed on May 24, 2018, now Pat. No. 10,348,959, which is a continuation of application No. 15/699,931, filed on Sep. 8, 2017, now Pat. No. 9,986,153, which is a continuation of application No. 15/385,580, filed on Dec. 20, 2016, now Pat. No. 9,762,792, which is a continuation of application No. 14/187,186, filed on Feb. 21, 2014, now Pat. No. 9,558,555.

(60) Provisional application No. 61/767,997, filed on Feb. 22, 2013.

(51) Int. Cl.
*G06V 40/20* (2022.01)
*G06T 7/70* (2017.01)

(56) References Cited

U.S. PATENT DOCUMENTS

| | | |
|---|---|---|
| 9,558,555 B2 | 1/2017 | Holz |
| 9,762,792 B2 | 9/2017 | Holz |
| 9,986,153 B2 | 5/2018 | Holz |
| 10,348,959 B2 | 7/2019 | Holz |
| 10,638,036 B2 * | 4/2020 | Holz ............... G06T 7/50 |
| 10,999,494 B2 * | 5/2021 | Holz ............... G06T 7/70 |
| 2002/0008139 A1 | 1/2002 | Albertelli |
| 2002/0041327 A1 | 4/2002 | Hildreth et al. |
| 2002/0179866 A1 * | 12/2002 | Hoeller ............... G01B 9/02028 250/559.33 |
| 2005/0238201 A1 | 10/2005 | Shamaie |
| 2006/0262421 A1 | 11/2006 | Matsumoto et al. |
| 2008/0106746 A1 | 5/2008 | Shpunt et al. |
| 2008/0198178 A1 | 8/2008 | Julin et al. |
| 2009/0139778 A1 * | 6/2009 | Butler ............... G06F 3/0346 178/18.03 |
| 2010/0027845 A1 | 2/2010 | Kim et al. |
| 2010/0053612 A1 | 3/2010 | Ou-Yang et al. |
| 2011/0296353 A1 | 12/2011 | Ahmed et al. |
| 2012/0113316 A1 | 5/2012 | Ueta et al. |
| 2012/0127062 A1 * | 5/2012 | Bar-Zeev ............... G06T 19/006 345/6 |
| 2012/0236287 A1 * | 9/2012 | Lee ............... G06T 5/006 356/4.01 |
| 2013/0100257 A1 * | 4/2013 | Sawachi ............... H04N 13/139 348/49 |
| 2013/0142388 A1 | 6/2013 | Azuma |
| 2013/0182079 A1 | 7/2013 | Holz |
| 2013/0182897 A1 | 7/2013 | Holz |
| 2013/0215148 A1 * | 8/2013 | Antonyuk ............... G06F 3/017 345/633 |
| 2013/0258140 A1 | 10/2013 | Lipson et al. |
| 2014/0005484 A1 | 1/2014 | Charles |

FOREIGN PATENT DOCUMENTS

| | | |
|---|---|---|
| JP | 2011107681 | 6/2011 |
| JP | 2011107681 A | 6/2011 |
| JP | 2012527145 | 11/2012 |
| JP | 2012527145 A | 11/2012 |

OTHER PUBLICATIONS

U.S. Appl. No. 14/187,186—Office Action dated Feb. 4, 2016, 31 pages.
U.S. Appl. No. 14/187,186—Final Office Action dated Jul. 11, 2016, 22 pages.
PCT/US2014/013012—International Search Report and Written Opinion dated May 14, 2014, published as WO 2014116991, 12 pages.
U.S. Appl. No. 14/151,394—Office Action dated Oct. 22, 2015, 26 pgs.
U.S. Appl. No. 14/151,394—Office Action dated Apr. 5, 2016, 26 pages.
PCT/US2014/013012—International Preliminary Report on Patentability dated Jul. 28, 2015, 8 pages.
U.S. Appl. No. 15/385,580—Office Action dated Jan. 25, 2017, 19 pages.
U.S. Appl. No. 15/385,580—Response to Office Action dated Jan. 25, 2017, filed Apr. 25, 2017, 7 pages.
U.S. Appl. No. 15/385,580—Notice of Allowance dated May 9, 2017, 18 pages.
U.S. Appl. No. 15/699,931—Office Action dated Oct. 3, 2017, 16 pages.
U.S. Appl. No. 15/699,931—Response to Office Action dated Oct. 3, 2017, filed Dec. 20, 2017, 7 pages.
U.S. Appl. No. 15/699,931—Notice of Allowance dated Feb. 2, 2018, 18 pages.
U.S. Appl. No. 15/989,092—Office Action dated Nov. 20, 2018, 18 pages.
U.S. Appl. No. 15/989,092—Pre-Exam Amendment and Formalities dated Oct. 22, 2018, 15 pages.
U.S. Appl. No. 15/989,092—Response to Office Action dated Nov. 20, 2018, filed Feb. 19, 2019, 7 pages.
U.S. Appl. No. 15/989,092—Notice of Allowance dated Feb. 28, 2019, 20 pages.
U.S. Appl. No. 16/504,120—Office Action dated Sep. 11, 2019, 17 pages.
U.S. Appl. No. 16/504,120—Response to Office Action dated Sep. 11, 2019, filed Dec. 11, 2019, 7 pages.
U.S. Appl. No. 16/504,120—Notice of Allowance dated Jan. 2, 2020, 20 pages.
U.S. Appl. No. 16/857,104—Notice of Allowance dated Jan. 8, 2021, 20 pages.
U.S. Appl. No. 14/187,186 Notice of Allowance, dated Sep. 21, 2016, 13 pages.

* cited by examiner

ADJUSTING MOTION CAPTURE BASED ON THE DISTANCE BETWEEN TRACKED OBJECTS

RELATED APPLICATION

This application is a continuation of U.S. patent application Ser. No. 16/857,104 entitled "Adjusting Motion Capture Based on the Distance Between Tracked Objects", filed Apr. 23, 2020, which is a continuation of U.S. patent application Ser. No. 16/504,120, entitled "Adjusting Motion Capture Based on the Distance Between Tracked Objects", filed Jul. 5, 2019, which is a continuation of U.S. patent application Ser. No. 15/989,092, entitled "Adjusting Motion Capture Based on the Distance Between Tracked Objects", filed 24 May 2018, which is a continuation of U.S. patent application Ser. No. 15/699,931, entitled "Adjusting Motion Capture Based on the Distance Between Tracked Objects", filed 8 Sep. 2017, which is a continuation of U.S. patent application Ser. No. 15/385,580, entitled "Adjusting Motion Capture Based On The Distance Between Tracked Objects", filed 20 Dec. 2016, which is a continuation of U.S. patent application Ser. No. 14/187,186, entitled "Adjusting Motion Capture Based On the Distance Between Tracked Objects", filed 21 Feb. 2014, which claims the benefit of U.S. provisional Patent Application No. 61/767,997, entitled, "ADJUSTING MOTION CAPTURE BASED ON THE DISTANCE BETWEEN TRACKED OBJECTS," filed on Feb. 22, 2013. The provisional and non-provisional applications are hereby incorporated by reference for all purposes.

FIELD OF THE TECHNOLOGY DISCLOSED

Implementations of the technology disclosed generally relate to computer-based motion-tracking systems and, more particularly, to adjusting a tracking camera in accordance with tracked objects.

BACKGROUND

Traditionally, users have interacted with electronic devices (such as a computer or a television) or computing applications (such as computer games, multimedia applications, or office applications) via indirect input devices, including, for example, keyboards, joysticks, or remote controllers. The user manipulates the input devices to perform a particular operation, such as selecting a specific entry from a menu of operations. Modern input devices, however, include multiple buttons, often in a complex configuration, to facilitate communication of user commands to the electronic devices or computing applications; correct operation of these input devices is often challenging to the user. Additionally, actions performed on an input device generally do not correspond in any intuitive sense to the resulting changes on, for example, a screen display controlled by the device. Input devices can also be lost, and the frequent experience of searching for misplaced devices has become a frustrating staple of modern life.

An alternative mode of interaction involves recognizing and tracking the intentional movement of a user's hand, body, or any other object as it performs a gesture, which can be interpreted by the electronic device as user input or a command. For example, a motion-capture system can track the position of an object by acquiring one or more images of a spatial region that includes the object, panning or zooming the image-capture device so that the object remains in the field of view.

Many sophisticated or nuanced gestures or motions, however, cannot easily be tracked, identified, or interpreted by these systems. A user can make large, broad gestures one moment followed by small, fine-tuning gestures. The capturing camera and/or supporting system may not be able to react or reconfigure itself quickly enough to capture, or assign meaning to, both kinds of gestures in quick succession. If the camera is zoomed out, for example, it can miss the subtleties of small gestures, whereas if the camera is zoomed in, it can fail to capture larger motions that stray outside the field of view. A need therefore exists for systems and methods capable of responsively adjusting to gestures that rapidly change in scale.

SUMMARY

The technology disclosed relates to adjusting the monitored field of view of a camera and/or a view of a virtual scene from a point of view of a virtual camera based on the distance between tracked objects. For example, if the user's hand is being tracked for gestures, the closer the hand gets to another object, the tighter the frame can become—i.e., the more the camera can zoom in so that the hand and the other object occupy most of the frame. The camera can also be reoriented so that the hand and the other object remain in the center of the field of view. The distance between two objects in a camera's field of view can be determined and a parameter of a motion-capture system adjusted based thereon. In particular, the pan and/or zoom levels of the camera may be adjusted in accordance with the distance; for example, the camera can zoom in to view a small distance or zoom out to view a large distance. A computer display can be similarly adjusted—that is, a representation of the objects (and/or graphical features controlled by the objects) on the display can be zoomed in for small distances and out for large distances.

These and other objects, along with advantages and features of the technology disclosed herein disclosed, will become more apparent through reference to the following description, the accompanying drawings, and the claims. Furthermore, it is to be understood that the features of the various implementations described herein are not mutually exclusive and can exist in various combinations and permutations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

As used herein, a given signal, event or value is "responsive to" a predecessor signal, event or value of the predecessor signal, event or value influenced by the given signal, event or value. If there is an intervening processing element, step or time period, the given signal, event or value can still be "responsive to" the predecessor signal, event or value. If the intervening processing element or step combines more than one signal, event or value, the signal output of the processing element or step is considered "dependent on" each of the signal, event or value inputs. If the given signal, event or value is the same as the predecessor signal, event or value, this is merely a degenerate case in which the given signal, event or value is still considered to be "dependent on" the predecessor signal, event or value. "Dependency" of a given signal, event or value upon another signal, event or value is defined similarly.

Figure 1A:
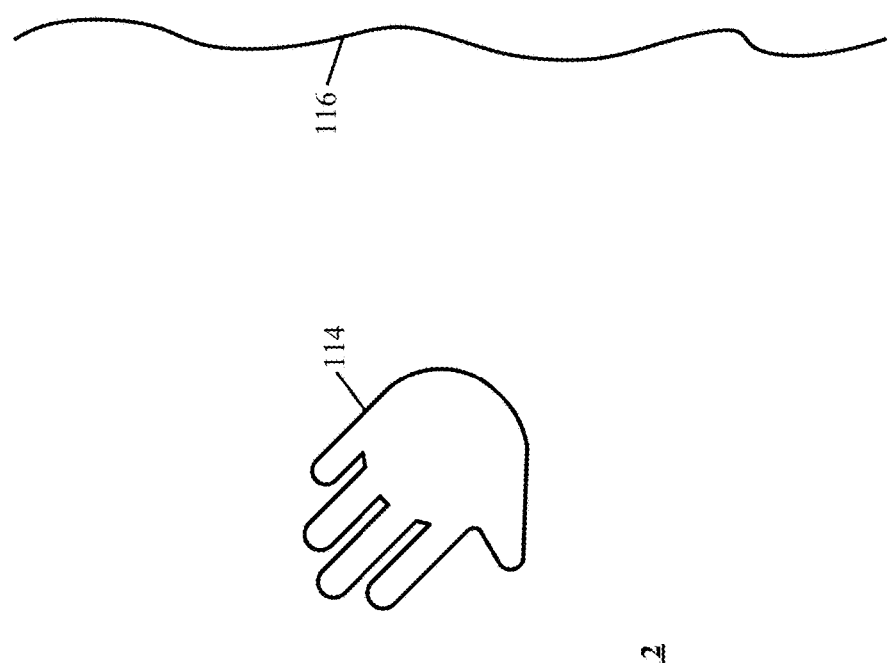
FIG. 1A schematically illustrates a motion-capture system in accordance with an implementation of the technology disclosed.
Figure 1A:
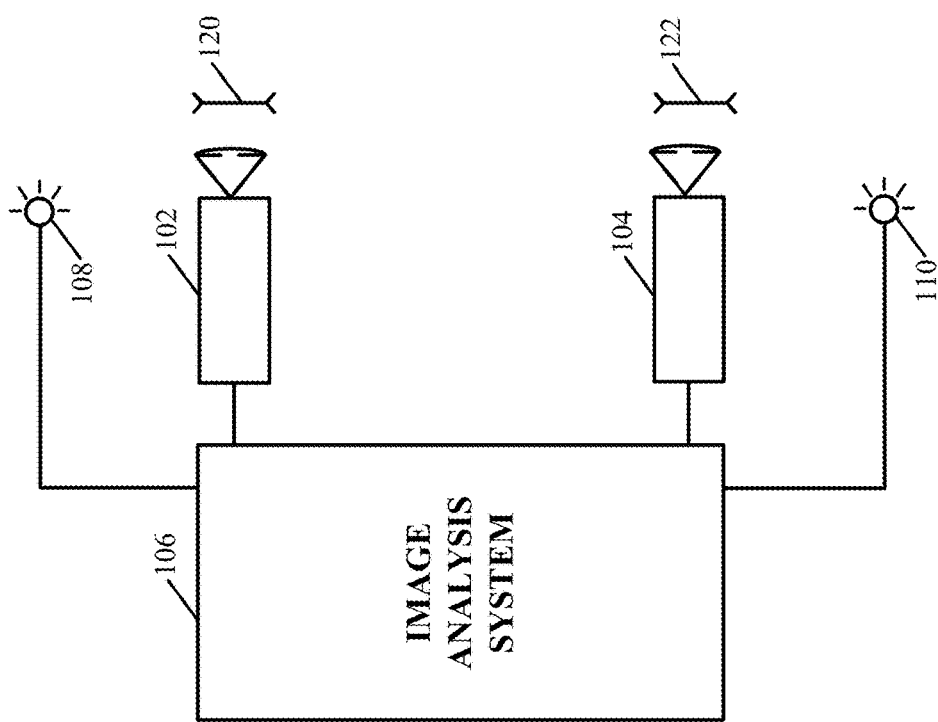

Referring first to FIG. 1A, which illustrates an exemplary gesture-recognition system 100A including any number of cameras 102, 104 coupled to an image-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. The term "light" is used generally to connote any electromagnetic radiation, which may or may not be within the visible spectrum, and can be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side.

In some implementations, the illustrated gesture-recognition system 100A includes one or more sources 108, 110, which can be disposed to either side of cameras 102, 104, and are controlled by image-analysis system 106. In one implementation, the sources 108, 110 are light sources. For example, the light sources can be infrared light sources, e.g., infrared light-emitting diodes (LEDs), and cameras 102, 104 can be sensitive to infrared light. Use of infrared light can allow the gesture-recognition system 100A to operate under a broad range of lighting conditions and can avoid various inconveniences or distractions that can be associated with directing visible light into the region where the person is moving. However, a particular wavelength or region of the electromagnetic spectrum can be required. In one implementation, filters 120, 122 are placed in front of cameras 102, 104 to filter out visible light so that only infrared light is registered in the images captured by cameras 102, 104. In another implementation, the sources 108, 110 are sonic sources providing sonic energy appropriate to one or more sonic sensors (not shown in FIG. 1A for clarity sake) used in conjunction with, or instead of, cameras 102, 104. The sonic sources transmit sound waves to the user; the user either blocks (or "sonic shadowing") or alters the sound waves (or "sonic deflections") that impinge upon her. Such sonic shadows and/or deflections can also be used to detect the user's gestures and/or provide presence information and/or distance information using ranging techniques known in the art. In some implementations, the sound waves are, for example, ultrasound, that is not audible to humans (e.g., ultrasound).

It should be stressed that the arrangement shown in FIG. 1A is representative and not limiting. For example, lasers or other light sources can be used instead of LEDs. In implementations that include laser(s), additional optics (e.g., a lens or diffuser) can be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 that includes a control object portion 114 (in this example, a hand) that can optionally hold a tool or other object of interest and cameras 102, 104 are oriented toward the region 112 to capture video images of the hand 114. In some implementations, the operation of light sources 108, 110 and cameras 102, 104 is controlled by the image-analysis system 106, which can be, e.g., a computer system, control logic implemented in hardware and/or software or combinations thereof. Based on the captured images, image-analysis system 106 determines the position and/or motion of object 114.

Figure 1B:
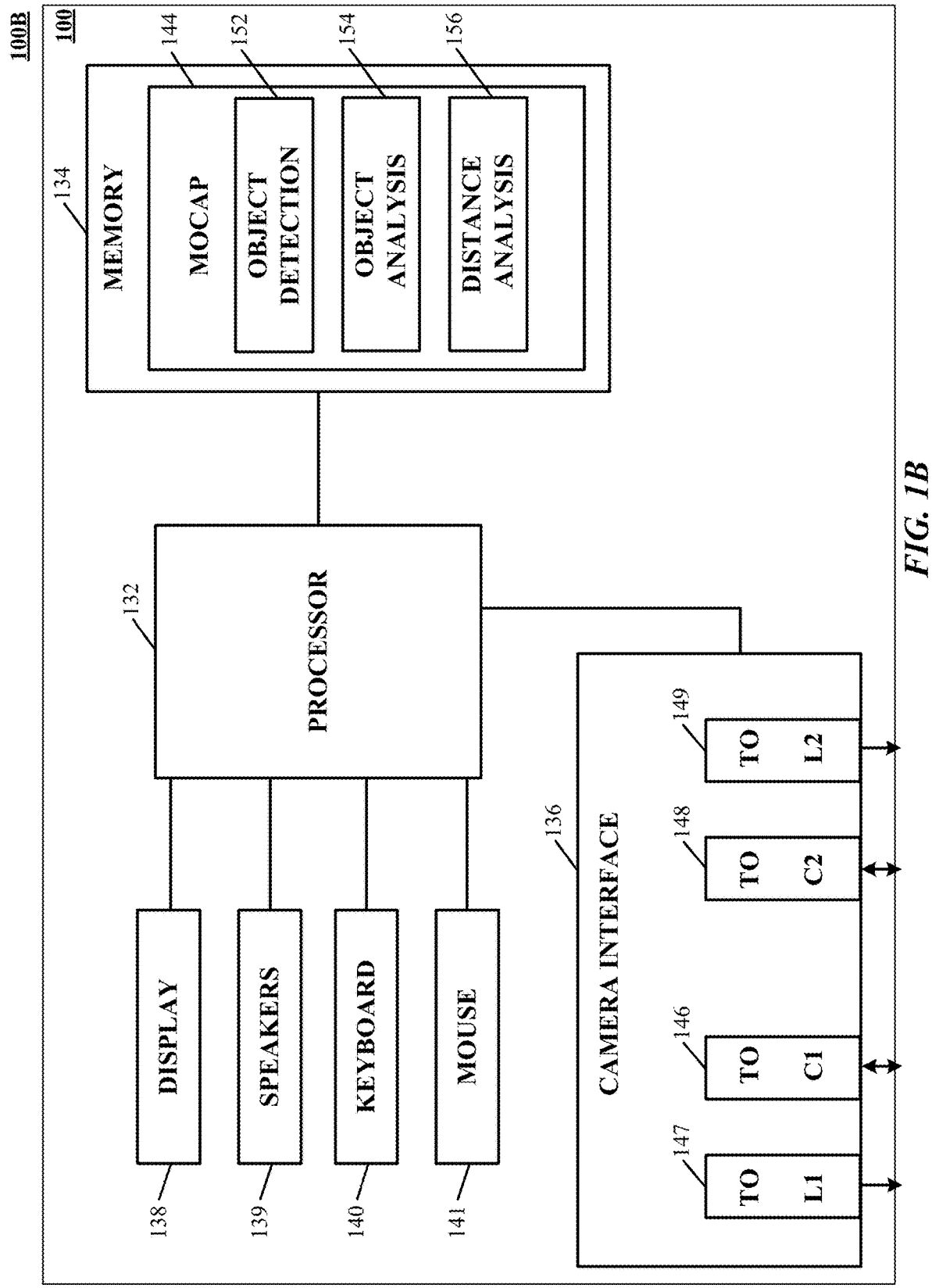
FIG. 1B illustrates a block diagram of a computer system implementing an image-analysis system in accordance with an implementation of the technology disclosed.

FIG. 1B is a simplified block diagram of a computer system 100B, implementing image-analysis system 106 (also referred to as an image analyzer) according to an implementation of the technology disclosed. Image-analysis system 106 can include or consist of any device or device component that is capable of capturing and processing image data. In some implementations, computer system 100B includes a processor 132, memory 134, a sensor interface 136, a display 138 (or other presentation mechanism(s), e.g. holographic projection systems, wearable googles or other head mounted displays (HMDs), heads up displays (HUDs), other visual presentation mechanisms or combinations thereof, speakers 139, a keyboard 140, and a mouse 141. Memory 134 can be used to store instructions to be executed by processor 132 as well as input and/or output data associated with execution of the instructions. In particular, memory 134 contains instructions, conceptually illustrated as a group of modules described in greater detail below, that control the operation of processor 132 and its interaction with the other hardware components. An operating system directs the execution of low-level, basic system functions such as memory allocation, file management and operation of mass storage devices. The operating system can be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION or OPENSTEP operating system, iOS, Android or other mobile operating systems, or another operating system platform.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 132 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Camera interface 136 can include hardware and/or software that enables communication between computer system 100B and cameras such as cameras 102, 104 shown in FIG. 1A, as well as associated light sources such as light sources 108, 110 of FIG. 1A. Thus, for example, camera interface 136 can include one or more data ports 146, 148 to which cameras can be connected, as well as hardware and/or software signal processors to modify data signals received from the cameras (e.g., to reduce noise or reformat data) prior to providing the signals as inputs to a motion-capture ("mocap") program 144 executing on processor 132. In some implementations, camera interface 136 can also transmit signals to the cameras, e.g., to activate or deactivate the cameras, to control camera settings (frame rate, image quality, sensitivity, etc.), or the like. Such signals can be transmitted, e.g., in response to control signals from processor 132, which can in turn be generated in response to user input or other detected events.

Camera interface 136 can also include controllers 147, 149, to which light sources (e.g., light sources 108, 110) can be connected. In some implementations, controllers 147, 149 provide operating current to the light sources, e.g., in response to instructions from processor 132 executing mocap program 144. In other implementations, the light sources can draw operating current from an external power supply, and controllers 147, 149 can generate control signals for the light sources, e.g., instructing the light sources to be turned on or off or changing the brightness. In some implementations, a single controller can be used to control multiple light sources.

Instructions defining mocap program 144 are stored in memory 134, and these instructions, when executed, perform motion-capture analysis on images supplied from cameras connected to sensor interface 136. In one implementation, mocap program 144 includes various modules, such as an object detection module 152, an object analysis module 154, and a distance-analysis module 156. Object detection module 152 can analyze images (e.g., images captured via camera interface 136) to detect edges of an object therein and/or other information about the object's location. Object analysis module 154 can analyze the object information provided by object detection module 152 to determine the 3D position and/or motion of the object (e.g., a user's hand). Distance analysis module 156 can analyze, in the manner set forth below, two or more objects detected by module 152 to determine the distance between them. Examples of operations that can be implemented in code modules of mocap program 144 are described below.

Display 138, speakers 139, keyboard 140, and mouse 141 can be used to facilitate user interaction with computer system 100B. In some implementations, results of gesture capture using camera interface 136 and mocap program 144 can be interpreted as user input. For example, a user can perform hand gestures that are analyzed using mocap program 144, and the results of this analysis can be interpreted as an instruction to some other program executing on processor 132 (e.g., a web browser, word processor, or other application). Thus, by way of illustration, a user might use upward or downward swiping gestures to "scroll" a webpage currently displayed on display 138, to use rotating gestures to increase or decrease the volume of audio output from speakers 139, and so on.

It will be appreciated that computer system 100B is illustrative and that variations and modifications are possible. Computer systems can be implemented in a variety of form factors, including server systems, desktop systems, laptop systems, tablets, smart phones or personal digital assistants, wearable devices, e.g., goggles, head mounted displays (HMDs), wrist computers, and so on. A particular implementation can include other functionality not described herein, e.g., wired and/or wireless network interfaces, media playing and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 100B is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

Figure 2A:
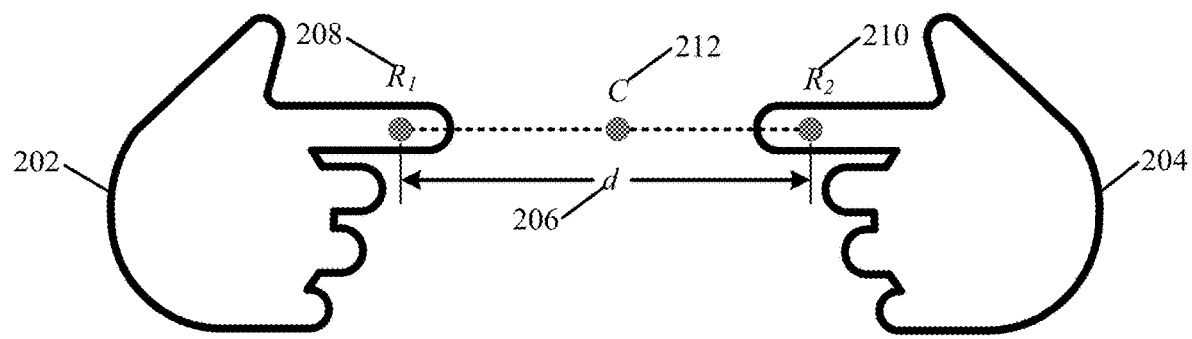
FIGS. 2A, 2B and 2C illustrate objects and distances therebetween for use in connection with implementations of the technology disclosed.
Figure 2B:
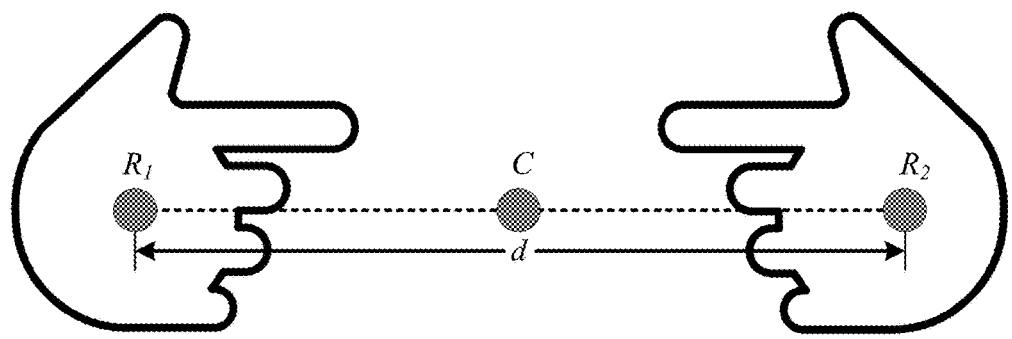
Figure 2C:
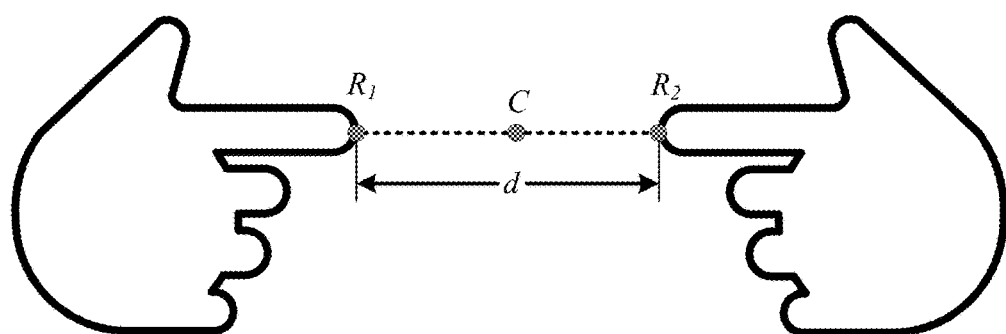

Referring now also to FIGS. 2A, 2B, and 2C, the object detection module 152 of the motion-capture system 100 identifies at least two objects 202, 204. One object 202 can be a hand of the user; the second object 204 can be another hand (as illustrated), a fixed object (e.g., a button, table, or control console), or a moving object (e.g., a wand or stylus). The technology disclosed is not, however, limited to any particular type of object. The two objects 202, 204 can be identified by a user (by, e.g., inputting a command to inform the system 100 which objects to track, by touching the object (which is sensed and interpreted by mocap 144 program as a designation), or otherwise signaling selection of one or more objects) or can be dynamically identified by the system 100 itself (e.g., by determining that the distance between the two objects 202, 204 is changing, by identifying the objects 202, 204 as the dominant objects in the region 112). The distance analysis module 156 dynamically measures the distance 206 between the two objects 202, 204 (the "object-to-object distance").

Measuring the object-to-object distance typically includes calculating, inferring, or otherwise determining the real-world spatial coordinates of each of the objects 202, 204. The cameras 102, 104 operate in conjunction with one or both of the light sources 108, 110 to provide 2D images of a viewed scene. For example, one light source 108 and two cameras 102, 104 can be used, or two light sources 108, 110 and one camera 102. From these 2D images, the system 100 determines the 3D position of the objects 202, 204. In particular, the distance analysis module 156 can derive the object-to-object distance 206 from the images themselves, from the 3D data generated by the system 100, or from other data generated therefrom (e.g., from 3D models constructed from the 3D data).

In various implementations, the system 100 changes one or more of its behaviors or parameters based on the object-to-object distance. For example, the measured distance 206 can be used to zoom and/or pan one or both of the cameras 102, 104. As used herein, the term "zoom" means altering the focal length (and thus the angle of view) of a camera's optics, and the term "pan" means shifting the field of view of the camera, e.g., by rotating the camera around an axis. Panning and/or zooming the cameras 102, 104 can improve the accuracy of the system 100 by, for example, zooming in to enlarge a portion of a scene to better view details if the object-to-object distance is small, or zooming out of a scene to retain two designated objects within the field of view if the object-to-object distance is large. The zoom levels of the cameras 102, 104 can be adjusted optically, digitally, or by any other means of increasing or decreasing the zoom level of the acquired images; for example, in response to commands issued by distance analysis module 156, the cameras 102, 104 can reduce or increase the focal length of their lenses or can digitally magnify or de-magnify the images.

Alternatively or in addition, the measured distance 206 can be used to change what is shown on the display 138. The display 138 can display a view of a virtual scene from the point of view of a virtual camera, and the distance 206 can be used to change the position of the virtual camera relative to the virtual scene. The display 138 can also or in addition display virtual elements, symbols, or other graphics that can change (in size, shape, view, or sensitivity with respect to a user command) based on the distance 138. For example, if the measured distance 206 is small, the display 138 can be altered to show a close-up view of the objects 202, 204 (and/or interface elements related to the objects), and if the measured distance 206 is large, the display can be altered to show a wider-angle view of the objects 202, 204 (and/or interface elements related to the objects); in other words, zooming and/or panning can be achieved by adjustment of the cameras, or by adjustment of the display contents, or by adjusting the cameras and the display contents. The close-up view of the objects 202, 204 on the display 138 can permit a user to make smaller, more precise movements or gestures involving the objects 202, 204, while the wide-angle view can permit a user to make broader, coarser movements or gestures without leaving the field of view. In various implementations, the display 138 displays direct representations of the objects 202, 204 (e.g., a set of virtual, on-screen "hands" that mimic the size, shape, position, orientation, and movement of a user's real hands) or symbolic representations of the objects 202, 204 (e.g., a set of on-screen styli, points, or other symbols) that represent the position, orientation, and/or movement of a user's real hands). In other implementations, the display 138 does not display a direct or symbolic representation of the objects 202, 204; instead, the displayed contents react to the motion of the objects 202, 204. For example, the display 138 can present a globe that rotates in response to motion of the objects 202, 204 (e.g., hand gestures that suggest imparting spin), but does not include direct or symbolic representations of the objects 202, 204 themselves. In all of these cases, what is presented on the display 138 is considered "related to" the objects 202, 204 and/or motion thereof.

The system 100 can alternatively or in addition interpret a gesture by the user involving one or both of the objects 202, 204 differently based on the distance 206; for example, the sensitivity of the system 100 to gesture distances can be increased at small distances 206 to allow a user to have more precise control. A rotational movement of the two objects 202, 204, for example, can have more of an effect (i.e., cause a greater on-screen movement) if the two objects 202, 204 are far apart (e.g., 0.5 to one meter apart) and less of an effect (i.e., cause a smaller on-screen movement) if the two objects 202, 204 are close together (e.g., one to ten centimeters apart). For example, if the two objects 202, 204 are far apart, their rotation though a 90° movement can cause an on-screen map to rotate through 90°; if, however, the two objects 202, 204 are close together, their rotation through 90° can cause the on-screen map to rotate an amount less than 90° (e.g., 45°).

In one implementation, the distance analysis module 156 measures the object-to-object distance 206 as the shortest distance between the two objects 202, 204 (i.e., the distance d between the points $R_1$ on the first object 202 and $R_2$ on the second object 204 that are closest to each other), as shown in FIG. 2C (200C). In another implementation, the object-to-object distance 206 can be measured as the distance between selected reference points 208, 210 on each object 202, 204, as shown in FIG. 2A (200A); these reference points 208, 210 can be determined by the user or by the object analysis module 154. For example, the user can desire that a point on the index finger is always tracked as the reference point of a hand. The user can even set reference points on additional fingers of the hand, thereby indicating that each finger should be tracked as a separate object and the object-to-object distances measured accordingly; in such cases, the object-to-object distance used in determining a pan and/or zoom adjustment can be the average of these individual distances. In one implementation, as shown in FIG. 2B (200B), the object analysis module 154 determines the reference point of a recognized object as the average position of the center of the object. For example, the center of a user's palm can be the reference point on the user's hand.

The distance analysis module 156 can be configured to continuously adjust the zoom level (and/or other parameters of the system 100) as the object-to-object distance 206 changes. Alternatively, the parameters can be adjusted only after the distance 206 crosses a threshold. For example, if one of the objects being tracked is a hand, a slight movement, such as a hand tremor, can trigger an undesired zoom adjustment. The threshold value can be set by the user or by the distance analysis module 156 (e.g., using a filter or based on the frequency of detected movements, with higher-frequency movements assumed to be spurious); in one implementation, the threshold must be crossed before the parameters are adjusted. After the threshold value is crossed, the parameter can be adjusted continuously or in accordance with an updated threshold. In one implementation, after the threshold is reached, the parameter is continuously updated until the rate of change of object-to-object distance 206 is at zero, or near zero, for a prerequisite amount of time, at which time the distance is compared again to the same or an updated threshold. A hysteretic delay between adjustments can be imposed to avoid excessive, visually distracting transitions, particularly if the frequency at which the threshold is crossed is high.

In another implementation, the parameter of the system 100 can be adjusted based on the rate of change of the object-to-object distance 206 in addition to, or instead of, the absolute object-to-object distance 206. If, for example, the rate of change is high, the view can be zoomed in or out quickly; if the rate of change is low, the distance analysis module 156 may not trigger a zoom level adjustment until the change in object-to-object distance 206 and/or its rate of change crosses a predetermined threshold value. The paths of one or both of the objects 202, 204 can be predicted and, if the prediction indicates a change in the distance 206, the parameter of the system 100 can be changed accordingly.

In one implementation, the distance analysis module 156 analyzes the 3D positions of objects 202, 204 as determined by object analysis module 154 to measure the distance of the objects 202, 204 to the cameras 102, 104 (the "object-to-camera distance"). The object analysis module 154 can thus be configured to trigger zoom level adjustment (or the adjustment of other parameters) based on the object-to-camera distance in addition to (or instead of) the object-to-object distance. For example, a decreasing object-to-object distance (e.g., the distance 206) can result in a greater change in zoom level at a large object-to-camera distance than if the same object-to-object distance were observed at a small object-to-camera distance. In other words, an object-to-object distance reduction of one centimeter might be clearly observable if the objects are only one meter from the cameras, but difficult to observe at twenty meters from the cameras, and the zoom level is adjusted accordingly.

In addition to tracking the distance 206 between the objects 202, 204, the distance analysis module 156 can also track the positions of the objects 202, 204. If the objects approach an edge of the field of view of the cameras 102, 104, for example, or an object represented on the display 134 approaches an edge thereof, the mocap program 144 can signal cameras 102, 104 to pan in order to track the object. As noted above, panning can refer to separately or congruently moving the individual fields of view of the cameras 102, 104 in any direction. The distance analysis module 156 can trigger panning based on the location on the objects 202, 204 to keep objects 202, 204 within the field of view.

Alternatively, the distance analysis module 156 can calculate and dynamically track a center point (centroid) 212 (referring again to FIG. 2A) between the objects 202, 204; panning can then be based on the location of the center point 212. For example, objects 202, 204 can move to the right at the same rate—thereby shifting the location of the center point 212 to the right—without altering the distance between them. This motion results in the cameras 102, 104 panning to right, but the zoom level remains constant. Alternatively, just one object 202 can move to the right while object 204 stays stationary. Accordingly, the system pans to the right and can also zoom out as the center point 212 has shifted to the right and the object-to-object distance 206 has increased. The motion-capture device can be configured to continuously trigger panning to keep the center point 212 at the center of the defined boundary, or it can be configured to only trigger panning once the center point 212 moves beyond a smaller boundary set within this boundary.

The motion-capture system 100 can be operable to run in a plurality of zoom level and panning control modes as described above to effectively track multiple objects of interest, and to adjust this tracking based on the level of information, feedback, or sensitivity required by the user, application of use, or system capabilities. Additionally, the distances measured by the distance analysis module 156 as described can be actual physical distances or the same concepts can be implemented using virtual distances, such as measured pixels.

Flowcharts

Figure 3:
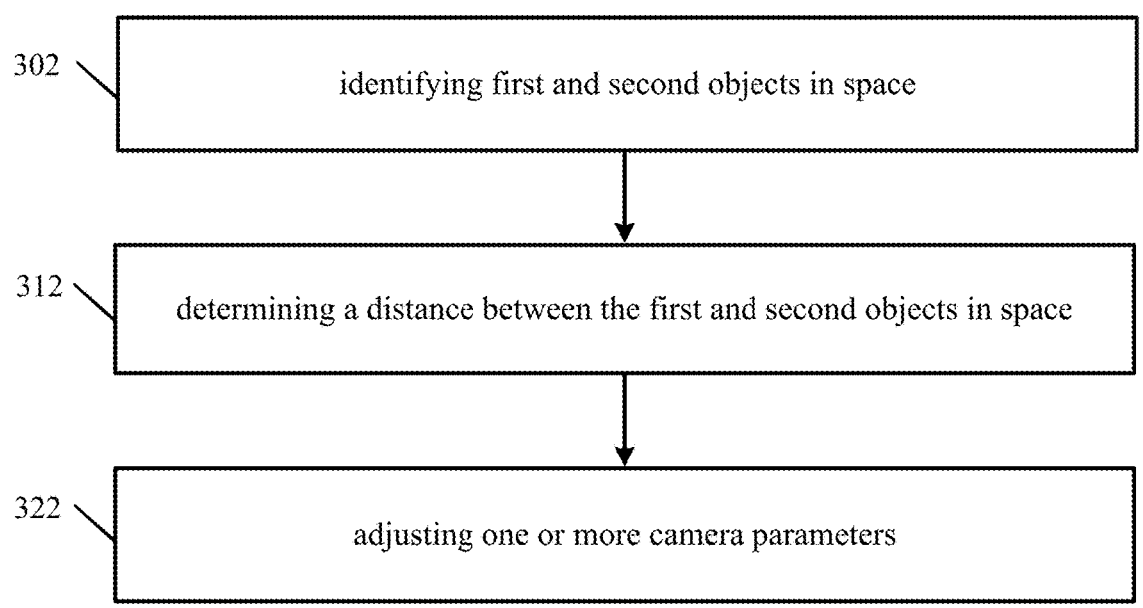
FIG. 3 shows a method of controlling a camera using a distance of two objects in space.

FIG. 3 shows a method 300 of controlling a camera using a distance of two objects in space. Flowchart 300 can be implemented at least partially with and/or by one or more processors configured to receive or retrieve information, process the information, store results, and transmit the results. Other implementations may perform the actions in different orders and/or with different, fewer or additional actions than those illustrated in FIG. 3. Multiple actions can be combined in some implementations. For convenience, this flowchart is described with reference to the system that carries out a method. The system is not necessarily part of the method.

At action 302, first and second objects are identified in space. In one implementation, the first and second objects are at least partially within a field of view of the camera. In other implementations, the first and second objects are entirely within a field of view of the camera.

At action 312, positional information of the first and second objects is determined from a distance between the first and second objects in space. In one implementation, the distance corresponds to an average distance between (i) a point on the first object closest to the second object and a point on the second object closest to the first object, (ii) a selected point on the first object and a selected point on the second object or (iii) a centroid of the first object and a centroid of the second.

At action 322, one or more camera parameters are adjusted based at least in part upon the distance determined. In one implementation, an updated distance for the objects is repeatedly determined from new positional information for the first and second objects and the one or more camera parameters are adjusted based at least in part upon the updated distance determined. In another implementation, a position of the field of view of the camera is adjusted based at least in part upon the updated distance determined. In some implementations, a zoom of the camera is adjusted based at least in part upon the updated distance determined.

In another implementation, a focal length of the camera is adjusted based at least in part upon the updated distance determined.

Figure 4:
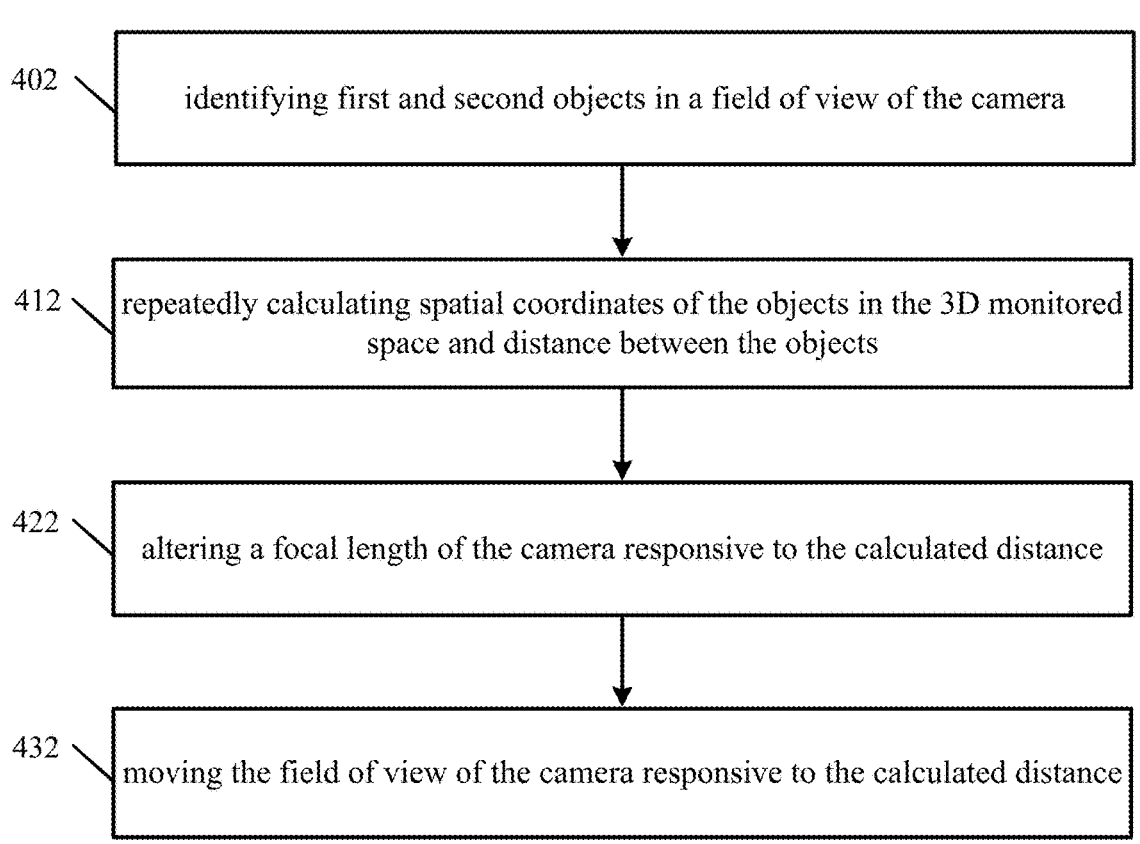
FIG. 4 depicts a representative method of controlling zoom level of a camera responsive to distance between two objects in a 3D monitored space.

FIG. 4 depicts a representative method 400 of controlling zoom level of a camera responsive to distance between two objects in a 3D monitored space. Flowchart 400 can be implemented at least partially with and/or by one or more processors configured to receive or retrieve information, process the information, store results, and transmit the results. Other implementations may perform the actions in different orders and/or with different, fewer or additional actions than those illustrated in FIG. 4. Multiple actions can be combined in some implementations. For convenience, this flowchart is described with reference to the system that carries out a method. The system is not necessarily part of the method.

At action 402, first and second objects in a field of view of the camera are identified. In some implementations, first and second objects are identified as objects to be tracked responsive to selection of the first and second objects by a touch gesture. In other implementations, first and second objects are identified as objects to be tracked responsive to changing distance between first and second objects.

At action 412, spatial coordinates of the objects in the 3D monitored space are repeatedly calculated and also the distance between the objects. In some implementations, the first object is a hand of a user and the second object is another hand of the user. In other implementations, the first object is a hand of a user and the second object is a fixed object. In yet other implementations, the first object is a hand of a user and the second object is a moving object. In some other implementations, a specification can be received from a user for reference points on the objects dependent on which distance between the objects is calculated.

At action 422, a focal length of the camera is altered responsive to responsive to the calculated distance. In some implementations, the focal length is decreased when the distance between the tracked objects increases or crosses a predetermined threshold distance. In other implementations, the focal length is increases when the distance between the tracked objects decreases or crosses a predetermined threshold distance. Yet other implementations include altering a focal length of the camera responsive to rate of change of the calculated distance. Some other implementations include calculating distance between the objects and the camera and responsive to the calculated distance between the objects and the camera and/or between the objects, altering a focal length of the camera.

At action 432, the field of view of the camera is moved responsive to the calculated distance by rotating the camera around an axis, as described above in the application.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 5:
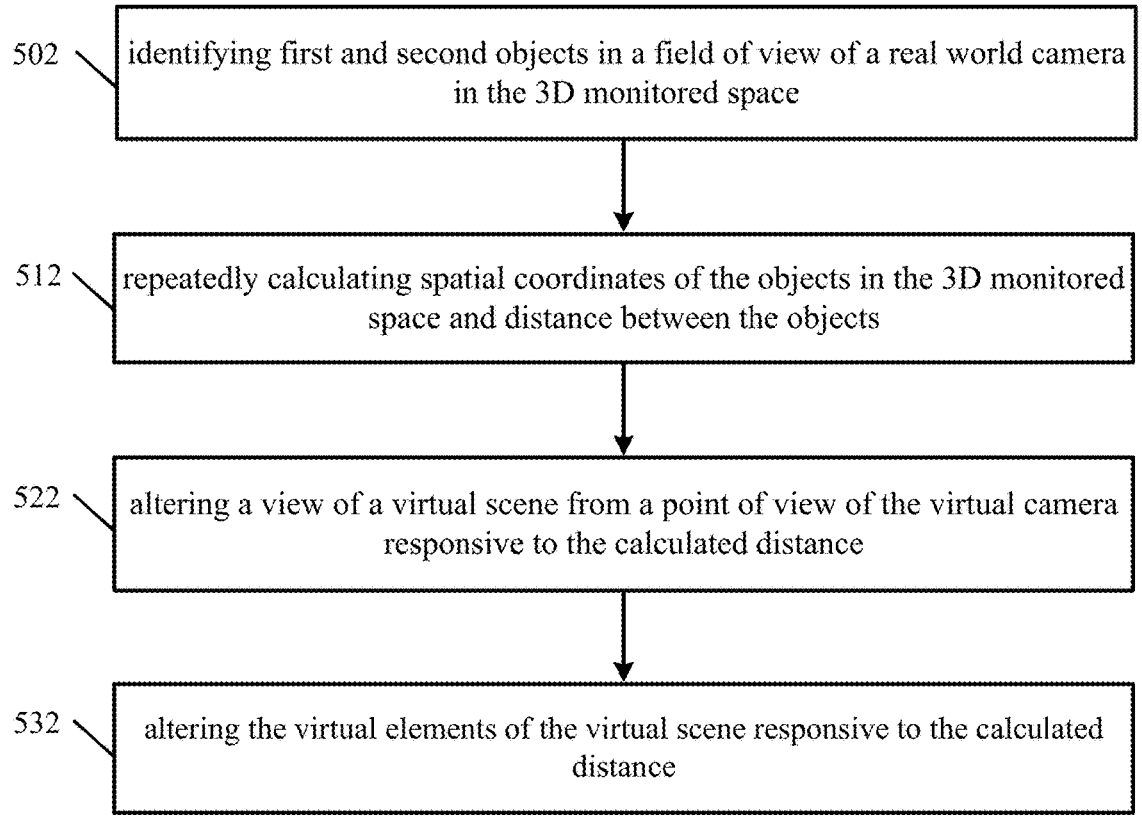
FIG. 5 illustrates one implementation of a method of controlling zoom level of a virtual camera responsive to distance between two objects in a 3D monitored space.

FIG. 5 illustrates one implementation of a method 500 of controlling zoom level of a virtual camera responsive to distance between two objects in a 3D monitored space. Flowchart 500 can be implemented at least partially with and/or by one or more processors configured to receive or retrieve information, process the information, store results, and transmit the results. Other implementations may perform the actions in different orders and/or with different, fewer or additional actions than those illustrated in FIG. 5. Multiple actions can be combined in some implementations. For convenience, this flowchart is described with reference to the system that carries out a method. The system is not necessarily part of the method.

At action 502, first and second objects in a field of view of a real world camera are identified. In some implementations, first and second objects are identified as objects to be tracked responsive to selection of the first and second objects by a touch gesture. In other implementations, first and second objects are identified as objects to be tracked responsive to changing distance between first and second objects.

At action 512, spatial coordinates of the objects in the 3D monitored space are repeatedly calculated and also the distance between the objects. In some implementations, the first object is a hand of a user and the second object is another hand of the user. In other implementations, the first object is a hand of a user and the second object is a fixed object. In yet other implementations, the first object is a hand of a user and the second object is a moving object. In some other implementations, a specification can be received from a user for reference points on the objects dependent on which distance between the objects is calculated.

At action 522, a view of a virtual scene from a point of view of the virtual camera is altered responsive to responsive to the calculated distance. In some implementations, the view of the virtual scene is moved responsive to the calculated distance. In other implementations, the view of the virtual scene is narrowed responsive to reduction the calculated distance. In yet other implementations, the view of the virtual scene is widened responsive to increase the calculated distance.

At action 532, the virtual elements of the virtual scene are altered responsive to the calculated distance. In one implementation, size of virtual elements in the virtual scene is adjusted responsive to the calculated distance. Some implementations include adjusting shape of virtual elements in the virtual scene responsive to the calculated distance. Other implementations include adjusting responsiveness of virtual elements in the virtual scene responsive to the calculated distance.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 6:
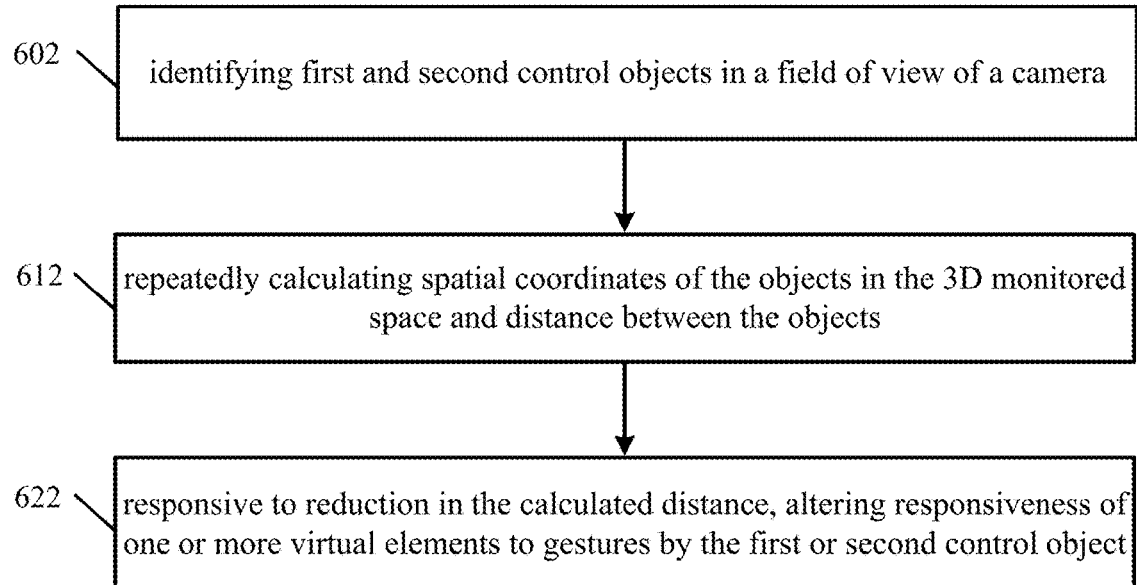
FIG. 6 is a flowchart showing a method of adapting a display between coarse and fine control movements responsive to distance between two control objects in a 3D monitored space.

FIG. 6 is a flowchart showing a method 600 of adapting a display between coarse and fine control movements responsive to distance between two control objects in a 3D monitored space. Flowchart 600 can be implemented at least partially with and/or by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

At action 602, first and second objects in a field of view of a real world camera are identified. In some implementations, first and second objects are identified as objects to be tracked responsive to selection of the first and second objects by a touch gesture. In other implementations, first and second objects are identified as objects to be tracked responsive to changing distance between first and second objects.

At action 612, spatial coordinates of the objects in the 3D monitored space are repeatedly calculated and also the distance between the objects. In some implementations, the first object is a hand of a user and the second object is another hand of the user. In other implementations, the first object is a hand of a user and the second object is a fixed object. In yet other implementations, the first object is a hand of a user and the second object is a moving object. In some other implementations, a specification can be received from a user for reference points on the objects dependent on which distance between the objects is calculated.

At action 622, responsiveness of one or more virtual elements to gestures by the first or second control object is altered such that the gestures more precisely control the virtual elements. Some implementations include altering responsiveness of one or more virtual elements to gestures by the first or second control object such that the gestures by the first or second control object more coarsely control the virtual elements responsive to increase in the calculated distance. Other implementations include increasing responsiveness of the virtual elements responsive to increase in the calculated distance. Yet other implementations include decreasing responsiveness of the virtual elements responsive to reduction in the calculated distance.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 7:
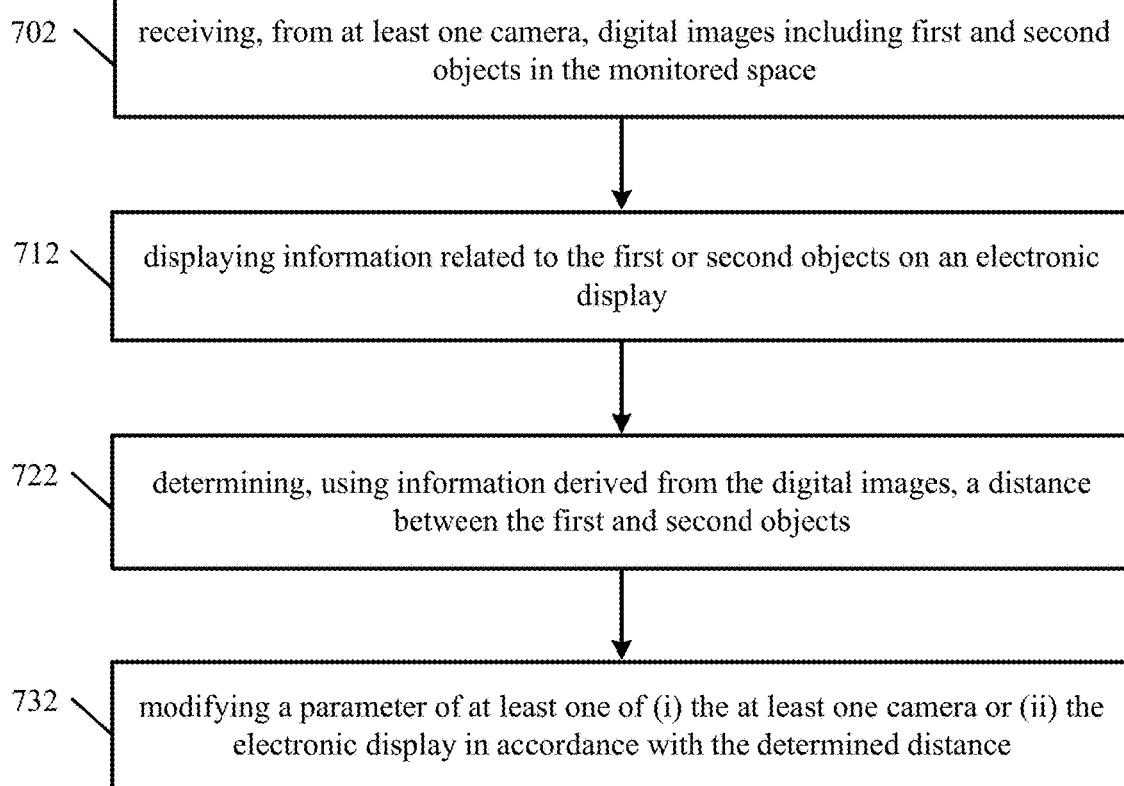
FIG. 7 illustrates a flowchart showing a method of adjusting a field of view for capturing movement of objects within a monitored space.

FIG. 7 illustrates a flowchart showing a method 700 of adjusting a field of view for capturing movement of objects within a monitored space. Flowchart 700 can be implemented at least partially with and/or by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

At action 702, digital images including first and second objects in the monitored space are received from at least one camera, as described above in this application. At action 712, information related to the first or second objects is displayed on an electronic display, as described above in this application.

At action 722, a distance between the first and second objects is determined using information derived from the digital images, as described above in this application. In one implementation, the distance corresponds to an average distance between (i) a point on the first object closest to the second object and a point on the second object closest to the first object, (ii) a selected point on the first object and a selected point on the second object or (iii) a centroid of the first object and a centroid of the second.

At action 732, a parameter of at least one of (i) the at least one camera or (ii) the electronic display is modified in accordance with the determined distance. In some implementations, the modified parameter is a zoom level of the at least one camera or an orientation of the at least one camera relative to the monitored space. One implementation includes the adjusted parameter being a view displayed on the electronic display. In one implementation, the first object is a hand of a user and the second object is an object identified by the user. In another implementation, the parameter is adjusted only when the distance crosses a predetermined threshold distance. In yet another implementation, threshold distance is based at least in part on a distance between the at least one camera and the first or second object. In some implementations, the zoom level is adjusted by zooming in or out at a rate based at least in part on a rate of change of the distance. In other implementations, modification of the parameter corresponds to panning the camera based on a position of the first object or the second object. In one implementation, the camera is panned so as to track (i) a midpoint of the distance between the first and second objects, (ii) the first object, or (iii) the second object.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:
1. An apparatus, including:
a head mounted display to present an output of a virtual camera to a user;
one or more cameras to capture images including a selection of first and second objects in a 3D monitored space identified in images captured by the one or more cameras using a gesture;
one or more processors coupled to a memory storing instructions that when executed by a processor perform using spatial coordinates obtained for the first and second objects, obtaining a calculated distance between the first and second objects as selected; and responsive to the calculated distance, adjusting at least one camera parameter; whereby adjusting the at least one camera parameter enables repeatedly obtaining spatial coordinates for the first and second objects from additional captured images of the first and second objects.

2. The apparatus of claim 1, further including instructions that when executed implement:
establishing a threshold value to be set for the calculated distance;
detecting the threshold value is reached by the calculated distance; and
responsive to the threshold value being reached, performing the adjusting on the at least one camera parameter after the threshold value is reached.

3. The apparatus of claim 1, further including instructions that when executed implement:
filtering spurious changes in the calculated distance detected in the images.

4. The apparatus of claim 1, wherein the adjusting includes:
adjusting a frame rate of at least one of the one or more cameras, based at least in part upon the calculated distance.

5. The apparatus of claim 1, wherein instructions that when executed implement adjusting at least one camera parameter include instructions that implement:
adjusting lighting conditions based at least in part upon the calculated distance.

6. The apparatus of claim 1, wherein instructions that when executed implement adjusting at least one camera parameter include instructions that implement:
moving a field of view of at least one of the one or more cameras responsive to the calculated distance.

7. The apparatus of claim 1, further including instructions that when executed implement identifying the gesture using the one or more cameras.

8. The apparatus of claim 1, further including instructions that when executed implement identifying first and second objects as objects to be tracked responsive to changing distance between first and second objects.

9. The apparatus of claim 1, wherein the first object is a first finger of a hand of a user and the second object is another finger of the hand of the user.

10. The apparatus of claim 1, wherein the first object is a hand of a user and the second object is another hand of the user.

11. The apparatus of claim 1, wherein the first object is a hand of a user and the second object is a fixed object or a moving object.

12. The apparatus of claim 1, further including instructions that when executed implement receiving a specification of reference points on the first and second objects dependent on which distance between the first and second objects is calculated.

13. The apparatus of claim 1, further including instructions that when executed implement:
obtaining a rate of change for the calculated distance; and
altering the at least one camera parameter responsive to the rate of change of the calculated distance.

14. The apparatus of claim 1, further including instructions that when executed implement:
obtaining a distance between the first and second objects and at least one camera of the one or more cameras; and
responsive to the distance between the first and second objects and the at least one camera, altering the at least one camera parameter.

15. The apparatus of claim 1, further including instructions that when executed implement obtaining an altered view of a virtual scene from a point of view of a virtual camera, the altered view of the virtual scene moved in responsive to the calculated distance.

16. The apparatus of claim 1, further including instructions that when executed implement obtaining an altered view of a virtual scene from a point of view of a virtual camera, the altered view of the virtual scene narrowed responsive to reduction in the calculated distance or widened responsive to increase in the calculated distance.

17. The apparatus of claim 1, further including instructions that when executed implement obtaining an altered view of a virtual scene from a point of view of a virtual camera, wherein size or shape of virtual elements in the altered view of the virtual scene has been adjusted responsive to the calculated distance.

18. The apparatus of claim 1, further including instructions that when executed implement obtaining an altered view of a virtual scene from a point of view of a virtual camera, wherein responsiveness of virtual elements in the altered view of the virtual scene has been adjusted responsive to the calculated distance.

19. The apparatus of claim 1, further including instructions that when executed implement:
responsive to reduction in the calculated distance, altering responsiveness of one or more virtual elements to gestures by at least one of the first and second objects; wherein the gestures made by the at least one of the first and second objects, control the virtual elements more precisely with reduction in the calculated distance.

20. The apparatus of claim 1, further including instructions that when executed implement responsive to increase in the calculated distance, altering responsiveness of one or more virtual elements to gestures made by at last one of the first and second objects; wherein the gestures made by the at least one of the first and second objects, control the virtual elements more coarsely with increasing calculated distance.

* * * * *